J. D. LOWE.
INTERNAL COMBUSTION ENGINE.
APPLICATION FILED JAN. 13, 1913.
1,102,675.
Patented July 7, 1914.
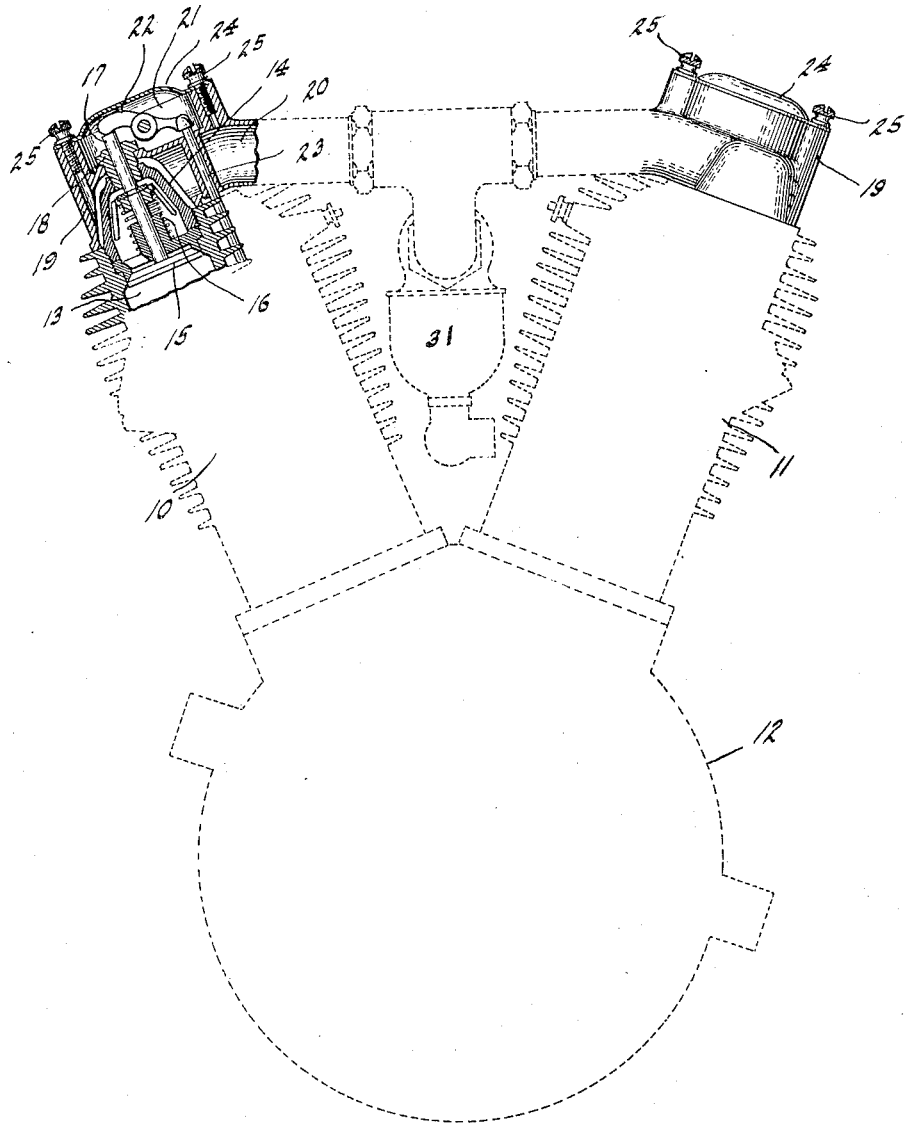
Witnesses
Frank A. Fahle
May Layden
Inventor
John D. Lowe,
By Arthur M. Hood
Attorney

UNITED STATES PATENT OFFICE.

JOHN D. LOWE, OF INDIANAPOLIS, INDIANA, ASSIGNOR TO THE F. W. SPACKE MACHINE COMPANY, OF INDIANAPOLIS, INDIANA, A CORPORATION OF INDIANA.

INTERNAL-COMBUSTION ENGINE.

1,102,675.     Specification of Letters Patent.     Patented July 7, 1914.

Application filed January 13, 1913. Serial No. 741,724.

*To all whom it may concern:*

Be it known that I, JOHN D. LOWE, a subject of the King of Great Britain and Ireland, residing at Indianapolis, in the county of Marion and State of Indiana, have invented a new and useful Internal-Combustion Engine, of which the following is a specification.

In the operation of explosion engines, especially motor cycle engines, great difficulty is frequently experienced by reason of the dust and grit which settle on the exposed parts of the valve-operating mechanism, and especially on the valve stems and associated parts at the top of the engine cylinder, this dust and grit making it impossible to produce proper and lasting lubrication so that sticking of the parts is frequent.

It is the object of my present invention to protect these parts, and at the same time to provide suitable means for lubricating them and convenient means for priming the engine.

The single figure of the drawing is a side elevation, partly in section, of a twin-cylinder engine embodying my invention, the parts of the engine save where my invention is applied being indicated merely in dotted outline.

The engine shown has two cylinders 10 and 11, set at an angle to each other on a common crank case 12. Each cylinder is provided with a valve chamber 13, in the upper end of which is mounted an inlet valve casing 14 having an inwardly opening valve 15 spring-pressed, by a spring 16, to its seat. The stem 17 of the valve 15 extends through a bushing 18 threaded into the upper end of the valve casing 14 and clamping a cap-piece 19 in place. This cap-piece is provided with a fuel inlet passage 20, supplied from a carbureter 31, which fuel inlet passage extends to and surrounds the valve casing 14. It is also provided with a cup 21, into which the valve stem 17 projects and in which is mounted a lever bearing against the end of said valve stem and against a suitably operated valve-operating rod 23. The chamber 21 is closed by a cover 24, removably held in place by thumb screws 25, the holes for the screws 25 extending into the fuel inlet passage 20 so that by removing a screw 25 ready access for priming is obtained. A suitable lubricant, together with wicking or other lubricant holder if desired, may be placed in the chamber 21, and is prevented from contamination and evaporation by the cover 24, so that the inlet valve stem and its operating mechanism are always kept lubricated and are protected from the dust and grit of the road.

I claim as my invention:

1. In an internal combustion engine, the combination of a valve chamber, an inlet valve opening thereinto and provided with a stem, a cap-piece provided with a fuel supply passage and with a lubricant chamber into which the valve stem projects, means located in said lubricant chamber for transmitting motion to said valve stem, and a removable cover for said lubricant chamber.

2. In an internal combustion engine, the combination of a valve chamber, an inlet valve opening thereinto and provided with a stem, a cap piece provided with a fuel supply passage and with a lubricant chamber into which the valve stem projects, means located in said lubricant chamber for transmitting motion to said valve stem, a removable cover for said lubricant chamber, and a screw for holding said cover in place, the hole for said screw extending into the fuel supply passage.

3. In an internal combustion engine, the combination of a valve chamber having a fuel supply passage and a lubricant chamber, a valve between the valve chamber and the fuel supply passage, means located in the lubricant chamber for transmitting motion to said valve, a removable cover for said lubricant chamber, and a screw for holding said cover in place, the hole for said screw communicating with the fuel supply passage.

In witness whereof, I have hereunto set my hand at Indianapolis, Indiana, this tenth day of January, A. D. one thousand nine hundred and thirteen.

JOHN D. LOWE.

Witnesses:
     DALMAR T. BROWNLEE,
     G. B. SCHLEY.